Figure 3:
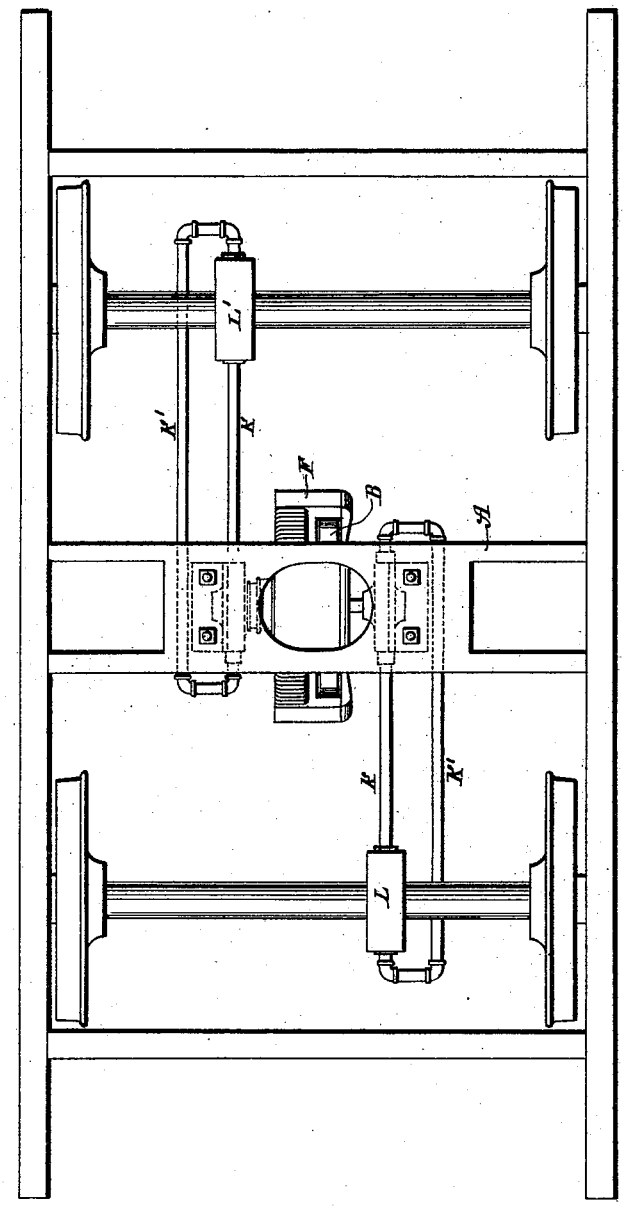

(No Model.) 2 Sheets—Sheet 1.
H. E. DEY.
ELECTRICALLY PROPELLED CAR.
No. 468,948. Patented Feb. 16, 1892.
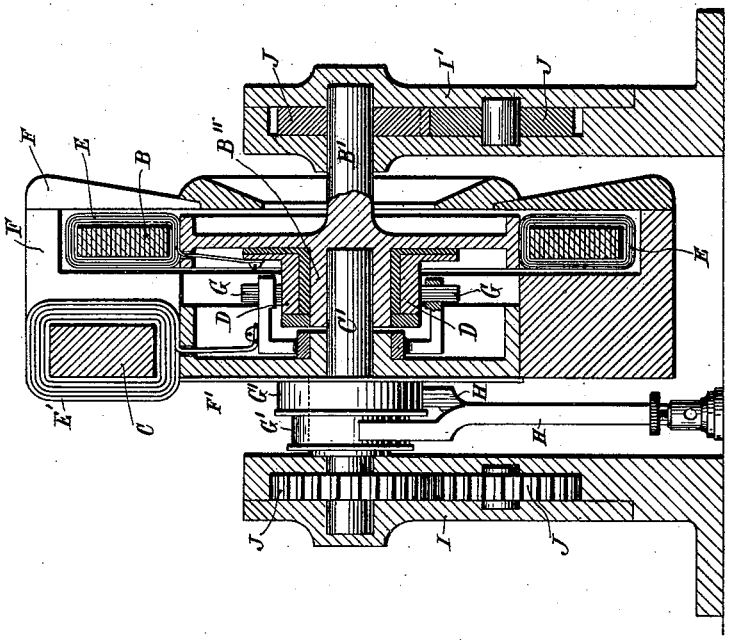
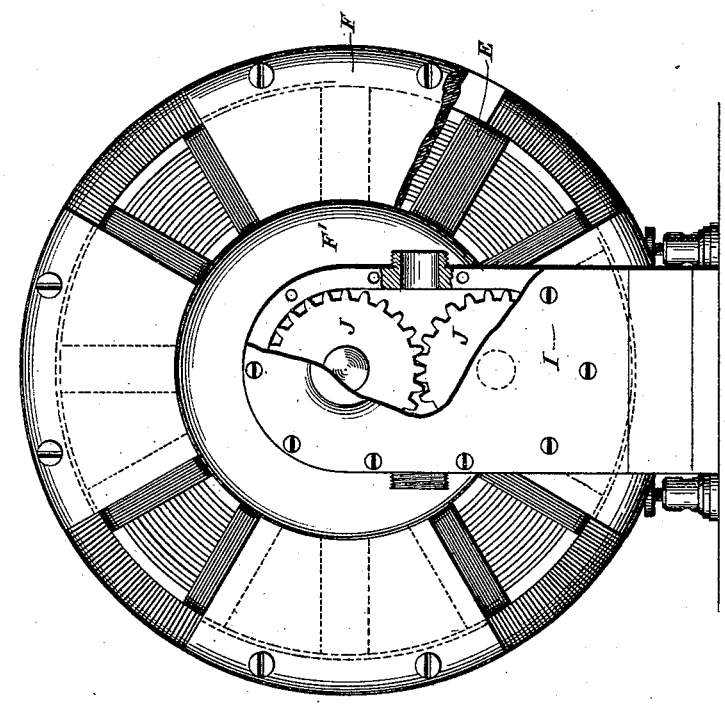
Witnesses:
Ernest Hopkinson
Frank B. Murphy
Inventor
Harry E. Dey
by Duncan & Page
Attorneys (No Model.)

2 Sheets—Sheet 2.

H. E. DEY.
ELECTRICALLY PROPELLED CAR.

No. 468,948. Patented Feb. 16, 1892.

Witnesses:
Ernest Hopkinson
Frank B. Murphy

Inventor
Harry E. Dey
by
Duncan & Page.
Attorneys.

UNITED STATES PATENT OFFICE.

HARRY E. DEY, OF BROOKLYN, NEW YORK, ASSIGNOR OF ONE-HALF TO FREDERICK B. GRISWOLD, OF HARTFORD, CONNECTICUT.

ELECTRICALLY-PROPELLED CAR.

SPECIFICATION forming part of Letters Patent No. 468,948, dated February 16, 1892.

Application filed July 14, 1891. Serial No. 399,466. (No model.)

*To all whom it may concern:*

Be it known that I, HARRY E. DEY, a citizen of the United States, residing at Brooklyn, in the county of Kings and State of New York, have invented certain new and useful Improvements in Electrically-Propelled Cars, of which the following is a specification, reference being had to the drawings accompanying and forming a part of the same.

The object of my present invention is to provide for the better running of street-cars and other vehicles of a similar character by electricity, to dispense with the gearing or other means now employed for transmitting to the axles the movements of the motor and which are so objectionable on account of the noise, and to provide means whereby a single electro-magnetic motor on each car may be used and operated under conditions of high efficiency and economy.

In carrying out my invention I employ for each car a single motor in which both the field-magnets and armature are capable of rotation and arranged to utilize such double rotation in effecting the movement of the car. I also employ between the motor and the axle as the means of transmitting the power to the wheels what is practically a fluid-belt—that is to say, on the axles are rotary fluid-motors which are driven by similar motors or engines operated by the motor in the particular manner hereinafter set forth.

Figure 1 is a rear elevation of the electric motor and what for convenience may be designated as one of the "rotary" pump-engines. Fig. 2 is a vertical central section of the same, and Fig. 3 is a top plan view of a car-truck equipped with my improvements.

The car-truck may be of any of the usual constructions, and I have omitted from the drawings such of its appurtenances as are not directly connected with the improvements. On a suitable cross-bar A, forming a part of the truck, I secure the electric motor. This motor contains an armature B and a field-magnet C, the former mounted on or carried by a shaft B' and the latter on a shaft C'. The end of shaft B' is provided with an extension formed as a socket B'', into which the end of shaft C' extends and which forms one of the bearings for said shaft. Secured to this extension, but insulated therefrom, is a commutator D, the plates of which are connected with the several sections, respectively, of the coils E, which are wound on the armature B.

The field-magnet C consists of an iron ring formed with a number of enlargements or pole-pieces F, between which the energizing-coils E' are wound. The ring is carried by a disk or drum F', keyed to the shaft C'. On the hub of the disk F' are mounted the brushes G G, that bear on the commutator D, and these are electrically connected with two collecting-rings G' G', carried on the outwardly-projecting portion of said hub.

The field-coils E' are permanently connected either in series or in multiple with the brushes G G or the collecting-rings, and upon the latter bear two spring contacts or wipers H H, secured to a stationary part of the car or motor and forming the line-terminals thereof.

The ends of the two shafts B' C' of the armature and field-magnets, respectively, extend into casings I I', which afford the bearings for said shafts and which contain the intermeshing cogs or pistons J of rotary pumps or pump-engines. One of said pistons or cog-wheels of each pump is secured to one of the shafts and by the rotation of the electric motor and shafts there is maintained a forced circulation of oil or whatever fluid may be employed through the pumps. Around the axles and supported either by the flow and return pipes K K' or otherwise are similar pumps L L', each with one cog-wheel or piston fixed to its axle, which pumps serve as motors and impart to the wheels the rotary movements of the electric motors through the medium of the circulating fluid between the pump-engines and motors.

It will be seen that the rotation in opposite directions of the elements of the electric motor secures the same efficiency in the conversion of electric energy as if one of its elements only revolved at double speed. By driving one axle with the field and the other with the armature uniformity of results is obtained and the applied power is equally distributed. It will be seen, moreover, that the arrangement of the electric and pump motor and the motion-transmitting devices permits of the same methods of utilizing the electric motor as a brake and of driving the motor as a generator by the motion of the car as in the case of belts and gears, as heretofore employed.

It may be remarked that the supply of current for the electric motor may be from storage-batteries carried on the car or from a station through suitable conductors and traveling contacts. The fluid which I propose for the pump-engines and motors is oil, any leakage of which that may occur is easily replaced.

I am aware that the two axles of a motor-car have been geared to the independently-rotatable armature and field-magnet of an electric motor, and this I do not claim broadly.

I am also aware that rotary engines and pumps have been connected by circuit-pipes and utilized as a means of transmitting power; but my invention resides in the novel manner in which these devices are combined, whereby the mechanical construction of the means for propelling the car, while possessing the greatest capabilities, is very much simplified.

What I claim is—

1. The combination, on an electric car, with the cog-wheel or piston shafts of two rotary pump-engines secured to the car or its truck, of an armature mounted on one of said shafts, a field-magnet mounted on the other, the said armature and field-magnet being associated to constitute an electric motor and being independently rotatable, driving-axles, a rotary pump or field-motor for each axle, having one of its cog-wheels or pistons mounted on the axle, and pipes connecting each of said pumps with the engines, respectively.

2. The combination, on an electric car, with the casings secured to the car-body or its truck and containing the rotary intermeshing pistons of a pump or engine, the abutting shafts of the two engines, and the field-magnet of an electric motor secured to one of said shafts and the armature secured to the other, of driving-axles, rotary fluid-motors connected therewith, and flow and return pipes connecting the said motors with the rotary engines, as herein set forth.

HARRY E. DEY.

Witnesses:
 ROBT. F. GAYLORD,
 PARKER W. PAGE.